US005862372A

United States Patent [19]
Morris et al.

[11] Patent Number: 5,862,372
[45] Date of Patent: Jan. 19, 1999

[54] VISUALLY ORIENTED COMPUTER IMPLEMENTED APPLICATION DEVELOPMENT SYSTEM UTILIZING STANDARDIZED OBJECTS AND MULTIPLE VIEWS

[76] Inventors: Robert M. Morris, 201 Three Rivers Ct., Berwyn, Pa. 19312; Leet E. Denton, III, 148 Stoneway La., Bala Cynwood, Pa. 19004

[21] Appl. No.: 340,702

[22] Filed: Nov. 16, 1994

[51] Int. Cl.⁶ .................................. G06F 9/06; G06F 9/22
[52] U.S. Cl. ............................................. 395/701; 345/335
[58] Field of Search ..................................... 395/650, 700, 395/725, 701–710, 683; 364/200; 345/333, 967, 335

[56] References Cited

U.S. PATENT DOCUMENTS

| | | | |
|---|---|---|---|
| 4,455,619 | 6/1984 | Masui et al. | 364/900 |
| 5,019,961 | 5/1991 | Addesso et al. | 364/192 |
| 5,187,788 | 2/1993 | Marmelstein | 395/700 |
| 5,191,645 | 3/1993 | Carlucci et al. | 395/159 |
| 5,325,481 | 6/1994 | Hunt | 395/159 |
| 5,404,131 | 4/1995 | Torres | 364/521 |
| 5,410,648 | 4/1995 | Pazel | 395/158 |
| 5,442,744 | 8/1995 | Piech et al. | 395/154 |
| 5,446,548 | 8/1995 | Gerig | 356/375 |
| 5,455,948 | 10/1995 | Poole | 395/650 |
| 5,455,951 | 10/1995 | Bolton et al. | 395/700 |
| 5,470,218 | 11/1995 | Hillman | 425/144 |
| 5,481,712 | 1/1996 | Silver | 395/700 |
| 5,519,828 | 5/1996 | Rayner | 395/161 |
| 5,519,867 | 5/1996 | Moeller et al. | 395/700 |
| 5,544,301 | 8/1996 | Orton et al. | 395/157 |
| 5,555,369 | 9/1996 | Menendez et al. | 395/161 |
| 5,675,752 | 10/1997 | Scott et al. | 395/333 |

OTHER PUBLICATIONS

Power Biulder, User's Guide Version 3.0, Powersoft Enterprise Series, Chapter 10, pp. 255–287, Aug. 1993.
Gibbs, S., Composites Multimedia and Active Objects, OOPSLA '91, 1991.
Emery, J. et al, "A Multimedia Document Model for Continuous Media", IEEE Ondisc, pp. 640–643, 1993.
V_Graph Inc, Ozone manual, Version 1.5, 1995.
E. Brown, "Authoring Programs", New Media Tool Guide 1995, pp. 17–25, 1995.

Primary Examiner—Alvin E. Oberley
Assistant Examiner—Sue Lao
Attorney, Agent, or Firm—Laurence A. Weinberger

[57] ABSTRACT

A computer implemented application development (authoring) system permits objects (such as VBX custom controls) to be graphically inserted into the program under development by dragging and dropping associated icons into one of four views. The properties associated with the object may then be assigned settings. Development of a complete application is accomplished by visually arranging, ordering, and interconnecting the objects without the necessity of writing any code. The four views of Output, Map, Multitrack, and Workform may be synchronized so that changes made to the program in one view are simultaneously reflected in all other views. The system generates as output a script listing the objects and their properties which is then executed by a separate run time program. The system permits use of objects written to a standard specification and the addition at any time of additional objects written to that. Integration of the objects into the system is achieved by wrapping each object in an "envelope" of system specific properties.

4 Claims, 6 Drawing Sheets

| | Type | Filename | Label | BranchTo | WaitFor | Comment |
|---|---|---|---|---|---|---|
| 1 | V_GraphPIX | D:\BMP\HORSE.BMP | | | 0 | |
| 2 | V_GraphPIX | | | | 0 | |
| 3 | V_GraphTXT | | | | 0 | |
| 4 | V_GraphTXT | | | | 0 | |
| 5 | V_GraphBTN | | | V_GraphBTN 1 | 0 | |
| 6 | V_GraphPIX | | V_GraphPIX 1 | V_GraphWRK 1 | 0 | |
| 7 | V_GraphBTN | | V_GraphBTN 1 | | 0 | |
| 8 | V_GraphTXT | | | | 0 | |
| 9 | V_GraphWRK | | V_GraphWRK 1 | | 0 | |

VISUALLY ORIENTED COMPUTER IMPLEMENTED APPLICATION DEVELOPMENT SYSTEM UTILIZING STANDARDIZED OBJECTS AND MULTIPLE VIEWS

FIELD OF THE INVENTION

This invention relates to the use of a computer implemented application development process, and, more specifically, to an authoring system and its associated run time system which permits the creation of an application (program) in which standardized objects are incorporated into the application without the necessity of the user having knowledge any programming language or programming script, and in which the application development process can be monitored (observed, evaluated, etc.) through the multiple synchronized views of output display, timing sequence, logical relationships, and script workform.

BACKGROUND OF THE INVENTION

The last ten years has seen an explosive growth in the development of digital computer systems and technology both in the processing power and of the hardware systems and in the sophistication of the controlling software. Not only has the microprocessor become a ubiquitous incident to almost every laboratory, industrial, and household appliance, but many functions once assigned to combinations of moving parts are almost invariably now preformed by digitally controlled electronics. Systems as diverse as automobile ignition systems and home turntables now share a common electronic heritage. In fact, the performance of many electronic circuits can be equally implemented by hardware or by a digital computer under software control. In many instances the software component of the digital electronics has become enormously complex and correspondingly expensive to develop. Indeed, the cost of the electronic hardware has come down so far that the development time and cost of the software is now the limiting element in the introduction and pricing of many new systems. There has developed, therefore, a great need to reduce the cost and time of software development.

The development over the past three years of what is referred to as "multimedia" computer systems has increased the complexity of the required software as the systems access, simultaneously present, and then replace vast amounts of information. Present systems are directed toward the simultaneous presentation of audio and visual output, but systems are clearly on the horizon which will present coordinated output which can be sensed by all five human senses and create a virtual reality. While present systems access the information for multimedia presentation primarily from local magnetic and optical storage media, it is foreseeable that electronic and optical communication with the world through the coming "information superhighway" will provide a rich source of interactive multimedia In an attempt to reduce the cost and complexity of developing sophisticated software, attempts have been made over the last few years to modularize software functions with the idea that such modularized software could then be integrated into larger systems to achieve more complex functions. Each piece (object) of modularized software would consist of a set of instructions designed to perform a specific type of task which was frequently required in a more complex program. To use the objects, no knowledge of their internal coding structure would be necessary. All that would be required is to provide the modules with the information (parameters) they required for their use. Thus, applications would be built by selecting appropriate software modules and assembling/ordering/sequencing them to achieve higher order functions. This is the essential goal of "object oriented programming". It quickly became apparent that building with modularized software would not be efficient unless the presentation of the modules themselves conformed to some form of standard; i.e., flat bricks of any material can be stacked, mixed flat and curved bricks, no matter what material they are made of, do not stack well. A second problem facing object oriented programming is that efficiencies of application construction would only be achieved when the assembly of the objects did not require extensive and complex programming itself.

Several attempts have been made, therefore, to develop visually oriented programming systems in which software modules are manipulated as icons which may be arranged/ordered as needed and interconnected with logical operators. Examples of this can be found in the NeXT application development system, in the VIP Macintosh program, and in PowerBuilder, a Microsoft Windows program. Generally, in these types of application development systems, the software modules or objects are presented on a palette from which they are selected and "dragged" into the application under development. Ideally, in these systems, the software instructions needed to integrate the objects into a functioning whole (corresponding to the visual representation or map) are provided by the authoring program system. In reality, most of the prior art systems require the user to write some of the interconnecting software code either in a common higher order language or in a language specialized to that program.

It was hoped that the demand for complex and varied software imposed by multimedia programming requirements could be efficiently addressed by the use of object oriented programming. Until the present invention, these hopes have not been realized. A major problem not solved by the prior art has been the inability to handle in one visual, non-scripted, application development system the diverse requirements of different types of data required by a multimedia program in appropriate visual interfaces.

For instance, during the authoring process a view of the output generated by the application under development is useful when dealing with visual output (images). However, such a view is much less useful for dealing with audio output since, clearly, audio can not be seen. Correspondingly, a time line view in which the elements of the application program are represented by graphs plotting the relative times and sequences of presentation is much more useful for audio. Similarly, a logical map (flowchart paradigm), which visually relates the sequence and logical interconnections of each program element (visual, audio, etc.) is very useful for designing and following the basic structure of the application program. Sometimes, for quickly manipulating or editing particular parts of the developed application code, it is more useful to be able to view the program in a text view and treat the underlying script like a text document. Not only should the application development system provide, at any given moment, a view appropriate to the type of multimedia material being utilized, but such views should be able to be synchronized so that changes made in one view are instantly reflected in all the others. Prior art application development programs do not have the flexibility to present all four views, much less in a synchronized manner. Programs are available which are optimized for output view, map view, timeline view, and script view. Some permit more than one view with some synchronization. However, no prior art program permits access to all four synchronized views. In particular, no prior art program has successfully overcome the difficulty of simultaneously synchronizing the time line view to the other views.

Additionally, in an optimum visual, object oriented, application development program there should be available a wide variety of objects (software modules that would manipulate in different manners multimedia output) with the ability to easily add additional objects, developed by independent programmers, to the development system. Each added object should seemlessly be integrated so that it is available in all four views. Programs of the prior art each have their own object definition standards. That is, for an object to be incorporated into their system, it must meet that program's standards. No prior art program is available which will allow addition of objects not designed to its standard without the necessity of writing additional code to perform the interface to that object. Finally, it should be noted that application development systems necessarily consist of two major parts. The first is the authoring section which provides a customized output (script). The second is a run time system which takes the customized output and executes it. Some prior art run time systems for visually developed applications are notoriously slow in their execution.

SUMMARY OF THE INVENTION

The present invention overcomes the limitations of the prior art. First, the system can be used to author applications using an entirely visual programming scheme (paradigm) which does not require the user to know or be able to write any specialized code. Icons representing the objects (and accordingly their functionalities) may be placed (dragged) into an appropriate view. The system of the invention generates the information needed by the run time program. Second, during authoring, the user can access all four views which can be synchronized or not at the user's choice, and these views are available in overlapping windows. The user may, thus, work in the view most appropriate to the type of object the user is manipulating. Third, the objects which are available on the palette, can be added or subtracted from the development program with great ease. While the present implementation of the invention is designed to directly operate standardized Microsoft Visual Basic VBX controls as objects, the manner in which the invention wraps the objects is equally usable with objects written to standards other than the Microsoft VBX control. Fourth, the invention is capable of utilizing any objects written to a standard specification. That is, at its core it is featureless and extensible. The invention imposes no limitation on the type of function the objects can preform, and the objects need not be directed towards multimedia or any other single use. Thus, all types of programs can be developed utilizing the entire range of available objects, and, during application development, the objects may all be presented in the four views, once again synchronized or not. Fourth, a run time program is provided which executes the output of the authoring program much faster than the runtime programs of the prior art. These, and other advantages of the invention will become apparent from the description of the invention which follows.

DETAILED DESCRIPTION OF THE INVENTION

Definitions

In order to avoid the confusion often present in the world of computer jargon, for purposes of this application, the following terms shall have the meanings set forth below:

"APPLICATION" shall mean an end product computer program which is ready for use by its intended audience.

"CODE" shall mean a series of specialized words and symbols in a particular syntax which must be entered through a keyboard and which is then converted to a machine readable form.

"OBJECT" shall mean a modular software program written to a defined specification which may perform any function. For purposes of this application, the word "OBJECT" shall be considered synonymous with the term "custom control". Objects are intended to be grouped and assembled into applications.

"SCRIPT" shall mean a set of computer instructions written at a higher level than code i.e., farther removed from machine language, which is usually interpreted during execution. "SCRIPT" for purposes of this application shall also refer to the listing of objects and property settings generated by the authoring program of this invention.

"SYSTEM" shall mean the computer implemented application development system of this invention.

"WINDOWS" (when appearing in all capital letters) shall mean the Microsoft operating system of the same name without regard to the version number.

The present invention is an integrated computer implemented application development system which permits the user to create custom applications without writing a line of computer code. The ability to do just this has existed as a dream since computers moved into the public imagination and the dream is fulfilled by this invention. The invention provides a fully visual programming environment in which the user can create powerful WINDOWS applications in hours that would take days or weeks using standard programming languages. When describing the process implemented by a non-authoring computer system, it is generally sufficient to describe the process steps carried out and their order. However, authoring programs create an environment with many potentialities within which the user works to develop the application. To describe authoring programs it is necessary to describe the environment. Consider the analogy to building a house. The environment provides the tools (hammers, nails, saws, lumber, wires, pipes, etc.) as well as ways of looking at the house under construction (architectural plans, outside drawings, kitchen layouts, etc). Once the environment contains all the tools and views needed, the user can construct the house according to his/her own needs by assembling the parts.

This description of the computer implemented application development system will briefly: 1) describe the environment created by the present invention; 2) describe the process of using the system to create applications; 3)

describe the manner in which the system creates a script corresponding to the program elements and how that script is used by the run time program; and 4) describe how the system coordinates objects and permits additional objects to be added easily. A complete description of the invention is contained in the source code provided in the software appendix which is attached to this application.

Figure 1:
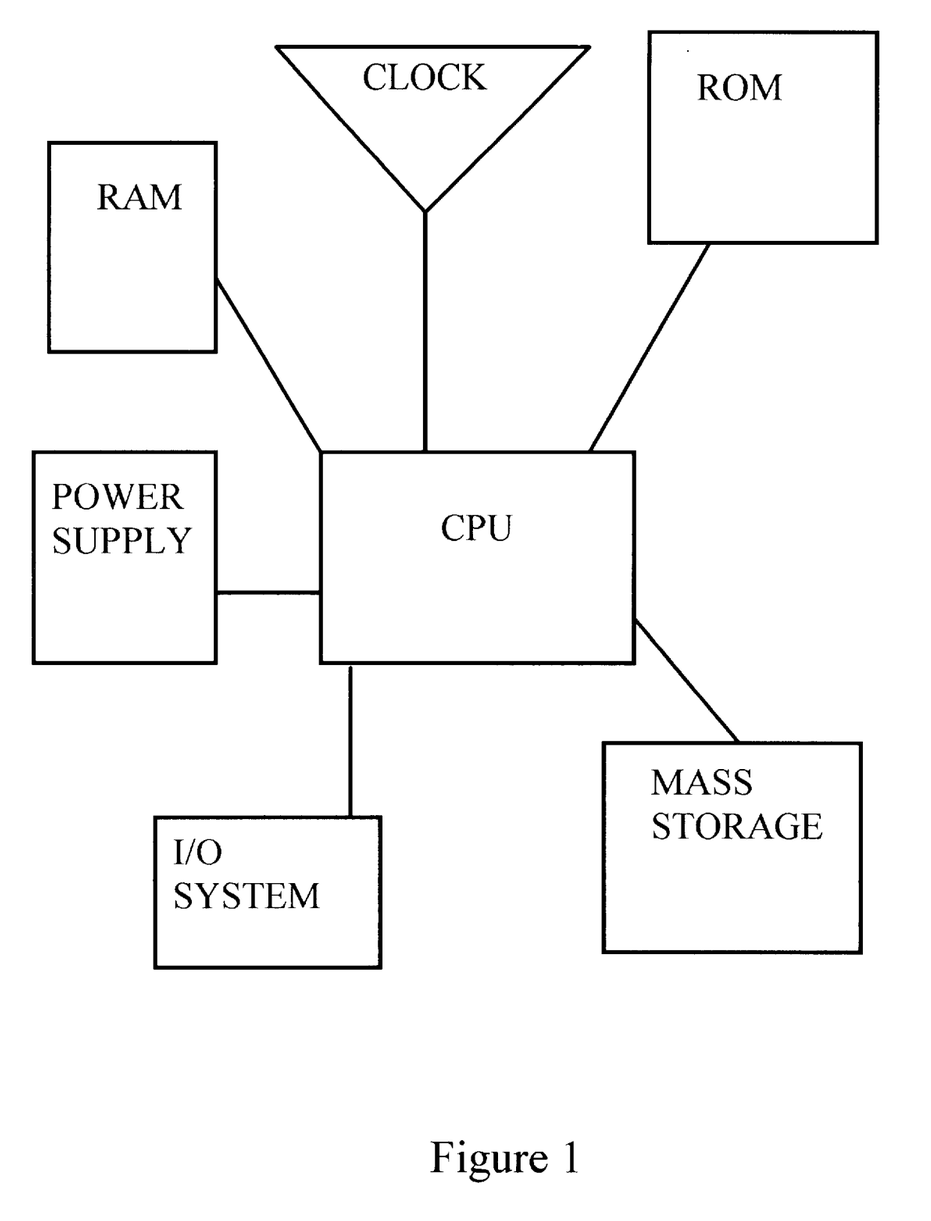
FIG. 1 shows a schematic representation of the major components of a modern programmable digital computer.

FIG. 1 is a block diagram showing the basic functional units of a modern digital computer with which the computer implemented applications development system of the invention works. Information may be stored on magnetic or optical media for access or be available through a connection to a remote information source. During the development of an application with the system of this invention, the user directs the incorporation of objects into one of the four views, modifies the properties associated with that object, and interconnects the objects so chosen. The user may direct the machine to accomplish these tasks using a pointer (such as a mouse) or a keyboard and visually observes his/her actions on the system's output display. As the system responds to the user's directions, it creates a script representing the application being developed by the user. When the development process is complete, the user stores the script on one of the system's storage devices.

One of the interesting features of the object oriented authoring system of this invention is that no traditional looking code, written in a programming language, is generated by the system. Rather, the output of the authoring system is a listing of the objects in order of appearance (in the program sequence) along with the properties associated with that object at that place in the sequence. The properties are the information or settings which specify to the object how it will perform. The computer implemented application development system records the settings for the objects and the order of execution of the objects in an output script. Thus, the system operates only at the object level. As the author proceeds in developing the application, the system adds to the script.

Figure 2:
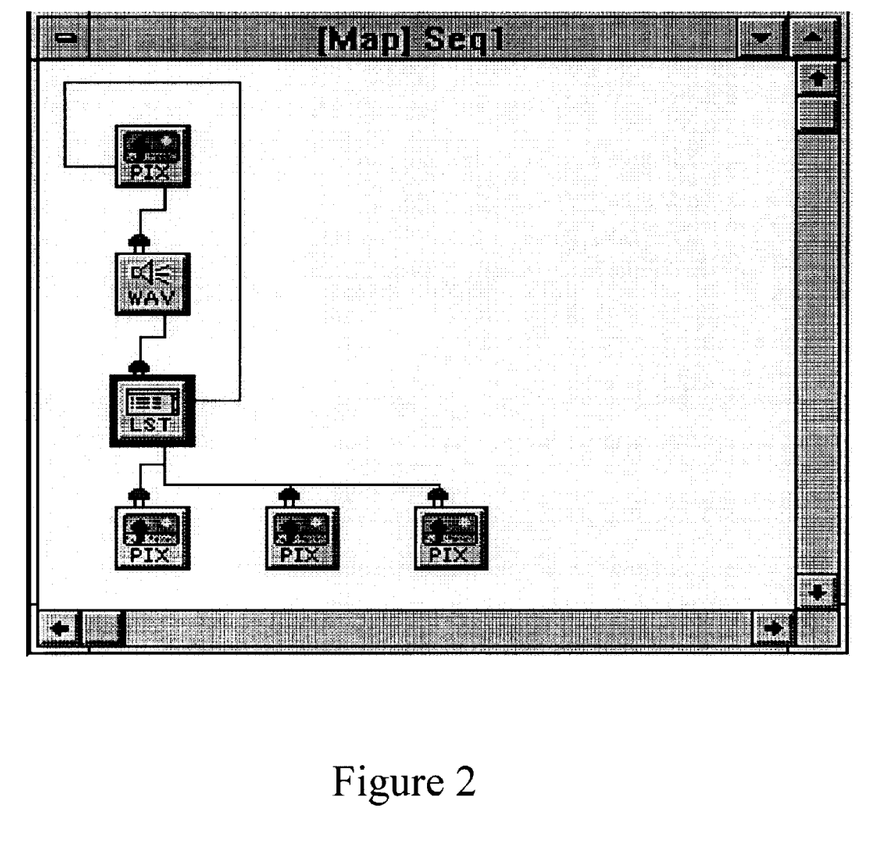
FIG. 2 shows a Map view of a simple program.

The four views are different ways to make and look at the same script. Each has its own special perspective and strength. FIG. 2 shows a Map view of a simple program in which the flow of the program and the flow of data is displayed. The Map view displays a block diagram in which the authored program is viewed as the sequence in which the objects are utilized, the branches which are taken, and the flow of data between the objects. The system not only allows the passing of data back and forth between different objects, but allows objects to affect each other in other ways as well. The Map view is best for seeing and building the program using a flowchart metaphor. Thinking of the program in this way can be very useful when building interactive applications since this view presents a way to see the flow of data between objects which can save hours of debugging time. When a Map window is opened, the system generates the Map view directly from the underlying script.

The Output view displays the screen output of the objects and is best for working directly with the product of the script. In this view you see the output of each object you incorporate into the program. When an Output view window is opened, the system generates the Output view directly from the underlying script.

Figure 3:
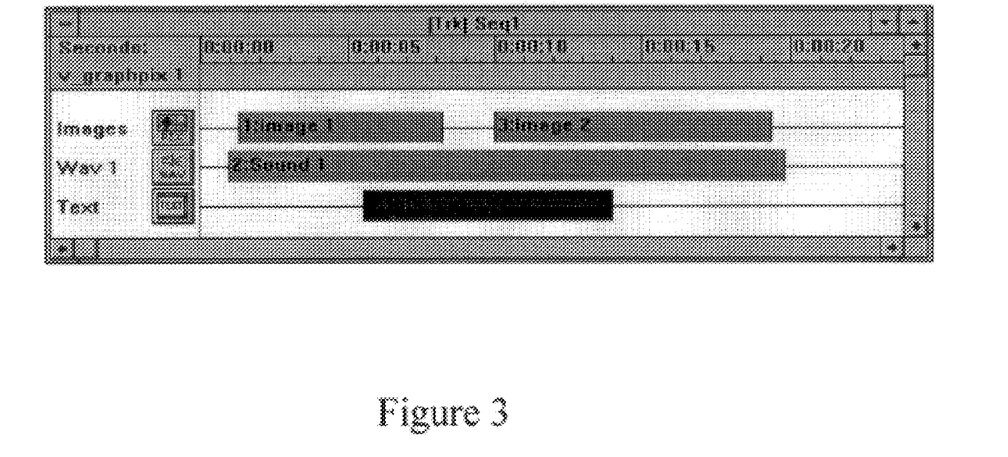
FIG. 3 shows a Multitrack view of a simple program.

FIG. 3 shows a Multitrack view of a simple program in which the timing sequences of object presentation are displayed. The Multitrack view is limited to coordinating and timing the appearance, disappearance, and activities of the objects. It is different from the other views because it is not a view of just any part of the script (program), it only views timed sections. This view is useful for creating parts of the application that require objects to be created and destroyed at specific times. The Multitrack view automatically sets all the special properties that differentiate the objects in these time sections form the objects in other parts of the application (script).

Figure 4:
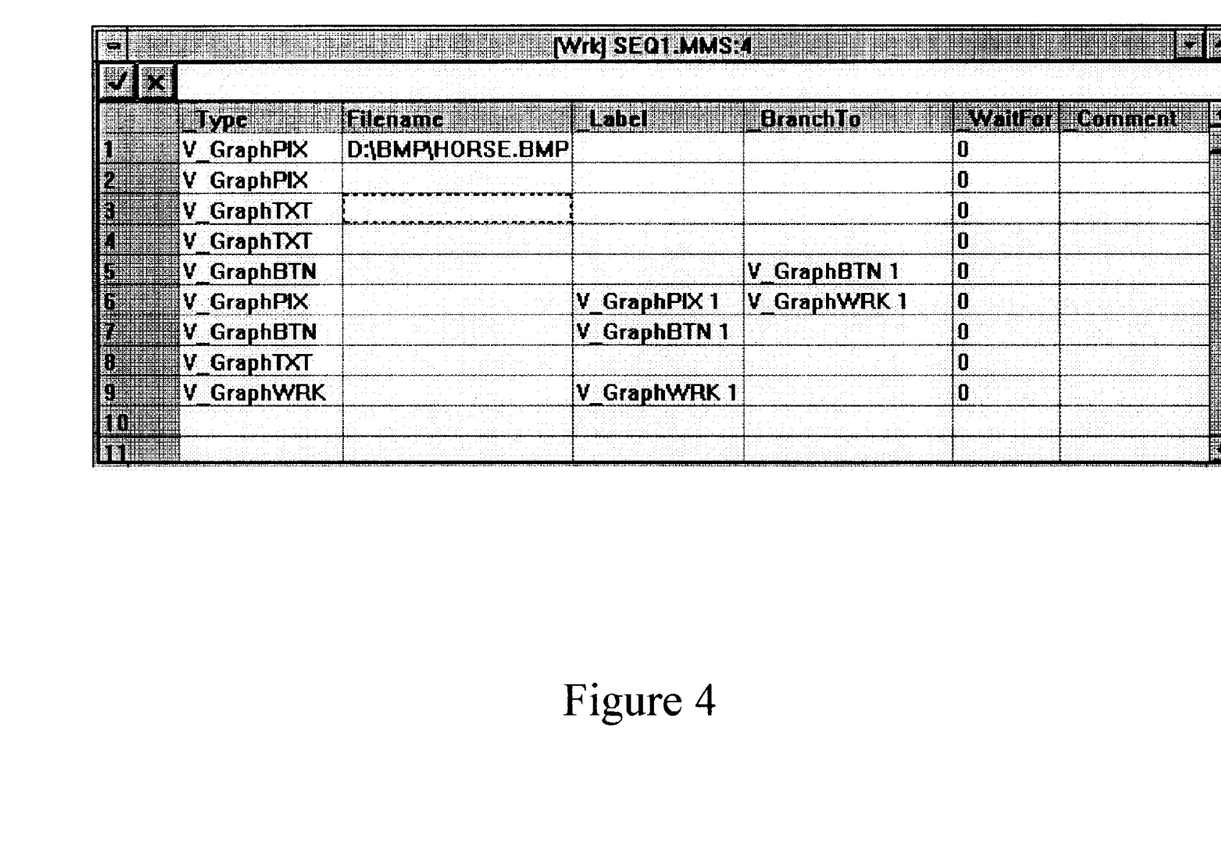
FIG. 4 shows a Workform view of a simple program.

FIG. 4 shows a Workform view of a simple program where each object and its associated properties is displayed in each row. The Workform view displays the underlying script directly and permits treating it like a text document. The script can be viewed in as little or as much detail as is necessary. This view has word processing features so that it becomes easy to make global changes, and to copy and move blocks of information.

Figure 5:
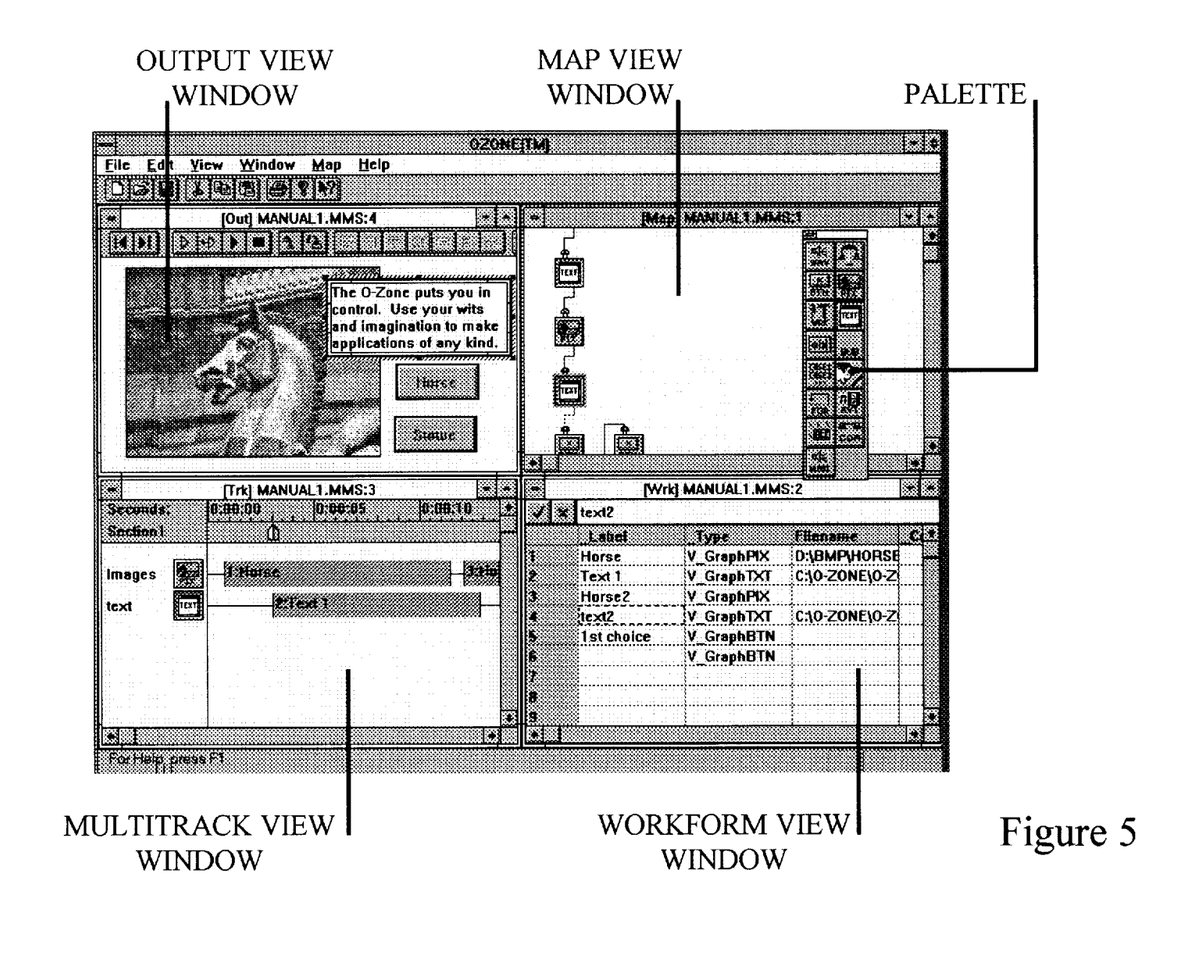
FIG. 5 shows for a simple program all four views, Output, Map, Multitrack, and Workform simultaneously displayed in separate windows.
Figure 6:
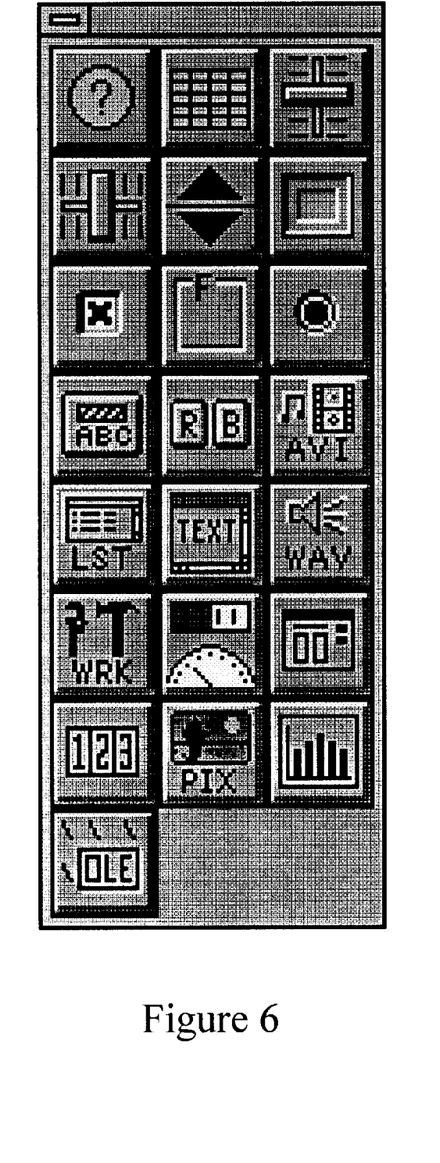
FIG. 6 shows a typical palette displaying the objects which are available to the user of the system.

FIG. 5 shows for a simple program all four views, Output, Map, Multitrack, and Workform simultaneously displayed in separate windows. In each view, the system of this invention permits development of the application using the same method of adding an object, interconnecting the object, and setting the objects properties. For instance, from a palette of objects, which displays a collection of icons that represent each object available to the system (such as the palette shown in FIG. 6), the user of the system drags an object into the view. The system simultaneously generates the underlying script which reflects the object and the properties associated with the object. The user's double click on the icon representing the object presents a menu list of the properties for that object the settings of which can be changed according to the user's requirements. If a separate dialog box is available for a particular property, clicking on the property gets the user to the dialog box. As a property setting is defined, the system records that definition in the associated underlying script. In addition, the system user can elect to have all the four views synchronized so that each view is updated for every change made in any view to the underlying script.

For example, in the Output view window the user might drag an icon representing an object which pulls a picture into the application program. The Output view window would then display the picture. If several pictures were to be presented in some order, several picture icons would be placed in the output view window. The user could set the order of presentation in the Workform view, but might more graphically do so in the Map view. In the Map view the user could arrange the picture icons in the order in which he/she wished the pictures to appear. In addition, in the Map view, the user could add conditional branches from picture to picture. The display timing for each picture could be set through the properties boxes or the Workform view, but might more graphically be done in the Multitrack view where each pictures duration and sequence would be indicated on parallel time lines. Finally, if the user wished to duplicate part of the application already created, he/she could use the Workform view to copy and move the underlying script. Clearly, the user of the system has the option of choosing the view most appropriate to the type of application under development. Since the system is a general purpose programming environment, the user will choose the view most appropriate for the application.

It should be noted that a very powerful feature of the Map view resides in its ability to permit the application developer to specify that one object in the sequence get or set data from/to another object. Thus, information exchange among objects is enabled as well as logical branching and program flow between objects.

In order to run a program developed in this manner from the script created by the authoring system, a run time program is required which executes each object in the defined sequence with the defined property settings. The system of this invention provides such a run time program. Programs authored by the computer implemented application development system of this invention run faster under its run time program than to object oriented programs developed and run under Microsoft Visual Basic.

The computer implemented application development system of this invention is able to integrate and work with the objects in the above described manner because, in addition to the internal properties which are unique to each object and relate to the special work that each object does, the system wraps all objects in a kind of "envelope" of special properties that regulate how the objects act in the system. These special properties are:

| | |
|---|---|
| BranchTo | Kill |
| Break | Label |
| Comment | TimeMark |
| Create | Track |
| Create Type | Type |
| Destroy | WaitFor |
| Destroy Type | Group |

No other program in the prior art wraps standardized objects in this manner to achieve similar functionalities. This wrapping is also what permits the easy integration of additional objects into the system. Also, the system is so designed that the number of such special properties may be increased, if necessary, to adapt to any changes in future definition of objects.

As noted earlier, there are many different standards for the format of objects which have been devised by the proponents of object oriented programming. Many prior art authoring systems use objects with their own proprietary standard. However the implementation of the authoring system of this invention disclosed in the software appendix has been designed to operate with "VBX custom controls" (objects) written to the Microsoft Visual Basic and Visual C++ standard. Presently, there are about 300 software vendors across the United States developing and selling such objects. Thus, a large number of objects written to the same standard are now available. The Microsoft Visual Control Pack contains representative objects and examples of code for different control types. Any object written to this standard may be used with the system of this invention. However, the methods employed by the present invention to wrap objects and integrate and run them directly from the system are equally applicable to objects written to other standards, and the scope of the present invention should not be considered limited by reference to the VBX control type object.

The source code in the software appendix does not contain any objects. As noted above, objects may be obtained through a large number of commercial suppliers. However, the system of this invention is sufficiently general to permit development of applications of all types. Specialized applications may be developed by importing appropriate standardized objects into the system. Thus, the system is infinitely extensible since it provides the necessary backbone environment for application development with objects written to a common standard.

While the software appendix discloses the source code for the computer implemented application development system of this invention in the WINDOWS and IBM-PC platform, the invention is not platform dependant and could also be implemented on the Macintosh and other platforms. In order to run the source code disclosure of this invention on a digital computer, the following commercially available software programs should be available on the computer: Microsoft Visual C++ 1.5, Microsoft WINDOWS 3.1, and objects of the user's choice written to the Microsoft VBX Custom Control standard, Version 1.0. For Microsoft Visual C++ 1.5, file VBAPI.H has been renamed to VB__VBAPI.H.

The computer implemented application development system of this invention is presently available from V__GRAPH, Inc. under the trademark OZONE.

What is claimed is:

1. A computer implemented application development system for visually developing an application without the necessity of writing any code comprising:
   a. means for wrapping objects written to a standard specification;
   b. means for establishing four views;
   c. means to synchronize said views;
   d. means for moving an object into one of four said views;
   e. means for setting the properties of said object;
   f. means for moving and setting the properties of additional objects until all of the desired objects have been specified;
   g. means for interconnecting the objects in temporal sequences;
   h. means for specifying the flow of data and control between the objects;
   i. means for generating a script reflecting means C. through H.; and
   j. means for running said script.

2. The system of claim 1 in which the objects written to a standard specification are VBX Custom Controls.

3. A computer implemented application development system comprising:
   a. means for storing objects written to a standard specification;
   b. wrapper means for encapsulating said stored objects;
   c. means for visually displaying the application under development comprising:
      (1) means for displaying an output view;
      (2) means for displaying a map view;
      (3) means for displaying a multitrack view; and
      (4) means for displaying a workform view;
   d. means for providing synchronization among four said visual display means;
   e. means for selecting from said object storage means one or more of said wrapped objects for inclusion into the application under development;
   f. means for setting the properties of each selected wrapped object;
   g. means for setting the desired temporal relationships among said wrapped objects;
   h. means for specifying the flow of data and control among said selected wrapped objects;
   i. means for creating and storing a persistent representation of said selected wrapped objects, the property settings of said objects, the temporal relationships among said objects, and the flow of data and control among said objects; and
   j. means for executing said representation.

4. The system of claim 3 in which the objects written to a standard specification are VBX Custom Controls.

\* \* \* \* \*